(12) United States Patent
Oltman

(10) Patent No.: US 12,162,387 B2
(45) Date of Patent: Dec. 10, 2024

(54) CHILD RESTRAINT

(71) Applicant: Dorel Juvenile Group, Inc., Foxboro, MA (US)

(72) Inventor: Stephen B. Oltman, Hope, IN (US)

(73) Assignee: Dorel Juvenile Group, Inc., Foxboro, MA (US)

(*) Notice: Subject to any disclaimer, the term of this patent is extended or adjusted under 35 U.S.C. 154(b) by 117 days.

(21) Appl. No.: 17/848,732

(22) Filed: Jun. 24, 2022

(65) Prior Publication Data

US 2023/0001832 A1 Jan. 5, 2023

Related U.S. Application Data

(60) Provisional application No. 63/215,069, filed on Jun. 25, 2021.

(51) Int. Cl.
| | |
|---|---|
| *B60N 2/28* | (2006.01) |
| *B32B 1/00* | (2024.01) |
| *B32B 5/18* | (2006.01) |
| *B32B 27/06* | (2006.01) |
| *B32B 27/32* | (2006.01) |

(52) U.S. Cl.
CPC ......... *B60N 2/2884* (2013.01); *B60N 2/2851* (2013.01); *B60N 2/2872* (2013.01); *B60N 2/2881* (2013.01); *B32B 1/00* (2013.01); *B32B 5/18* (2013.01); *B32B 27/065* (2013.01); *B32B 27/32* (2013.01); *B32B 2307/56* (2013.01); *B32B 2605/003* (2013.01)

(58) Field of Classification Search
CPC .. B60N 2/2881; B60N 2/2872; B60N 2/2884; B60N 2/2851; B32B 2307/56; B32B 27/065
See application file for complete search history.

(56) References Cited

U.S. PATENT DOCUMENTS

| | | | |
|---|---|---|---|
| 6,986,548 B2* | 1/2006 | Jane Santamaria .. | B60N 2/2803 297/483 |
| 7,234,771 B2 | 6/2007 | Nakhla | |
| 7,744,154 B2 | 6/2010 | Marsden | |
| 7,959,223 B2 | 6/2011 | Marsden | |
| 8,056,971 B2* | 11/2011 | Marsden ............... | B60N 2/2872 297/216.1 |
| 8,104,829 B2* | 1/2012 | Fritz .................... | B60N 2/2872 297/216.13 |
| 8,931,836 B2 | 1/2015 | Cheng | |
| 9,221,366 B2 | 12/2015 | Oltman | |
| 9,908,444 B2 | 3/2018 | Haas | |
| 9,937,823 B2 | 4/2018 | Williams | |

(Continued)

FOREIGN PATENT DOCUMENTS

| | | | | |
|---|---|---|---|---|
| EP | 2368752 A2 * | 9/2011 | ........... | B60N 2/2821 |
| WO | WO-2011054063 A1 * | 5/2011 | ............... | B60N 2/20 |

*Primary Examiner* — Milton Nelson, Jr.
(74) *Attorney, Agent, or Firm* — Barnes & Thornburg LLP

(57) ABSTRACT

A child restraint includes a seat bottom and a seat back coupled to the seat bottom. The seat back includes a backrest configured to extend upwardly from the seat bottom and a headrest coupled to the backrest for supporting a head of a child. The headrest includes a rear section arranged along the backrest, a first side section extending outwardly away from the rear section, and a second side section extending outwardly away from the rear section and away from the first side section.

12 Claims, 7 Drawing Sheets

(56) References Cited

U.S. PATENT DOCUMENTS

| | | |
|---|---|---|
| 9,950,649 B2 | 4/2018 | Pleiman |
| 10,118,510 B2 | 11/2018 | McRoberts |
| 11,247,588 B2 | 2/2022 | Kaiser |
| 11,390,194 B2 | 7/2022 | Maciejczyk |
| 2008/0258518 A1* | 10/2008 | Jane Santamaria ............................ B60N 2/42709 297/216.11 |
| 2009/0066125 A1* | 3/2009 | Nett ...................... B60N 2/2884 297/216.13 |

* cited by examiner

CHILD RESTRAINT

PRIORITY CLAIM

This application claims priority under 35 U.S.C. § 119(e) to U.S. Provisional Application Ser. No. 63/215,069, filed Jun. 25, 2021, which is expressly incorporated by reference herein.

BACKGROUND

The present disclosure relates to a child restraint, and particularly to a child restraint configured to be secured to a vehicle seat within a vehicle. More particularly, the present disclosure relates to a child restraint that is configured to reduce undesirable forces acting on a child in the child restraint during operation of vehicle.

SUMMARY

According to the present disclosure, a child restraint includes a seat bottom and a seat back coupled to the seat bottom. The seat back includes a backrest configured to extend upwardly from the seat bottom and a headrest coupled to the backrest for supporting a head of a child. The headrest includes a rear section arranged along a forward-facing surface of the backrest, a first side section extending outwardly away from the rear section, and a second side section extending outwardly away from the rear section and away from the first side section.

In illustrative embodiments, the child restraint further includes energy-redirection means coupled to the first and second side sections. The energy-redirection means redirect at least a portion of a cumulative force from the head of the child during an impact event into at least a first force extending into one of the first and second side sections and a second force extending outwardly away from the rear section of the headrest so that the head of the child does not experience the cumulative force when impacting the one of the first and second side sections. The first and second forces are each less than the cumulative force as a result of the head of child impacting the energy-redirection means.

In illustrative embodiments, the energy-redirection means includes at least one energy-redirection layer that is coupled to both the first side section and the second side section. The energy redirection layer has an outer, energy-redirection surface that faces toward the head of the child. The energy-redirection surface may be convexly-shaped relative to the head of the child. During a lateral impact event, the energy-redirection layer causes the head of the child to roll across the energy-redirection surface and to maintain contact with the energy-redirection surface for a longer period of time and/or distance during the lateral impact event. This disperses forces acting on the head of the child over a greater area and longer period of time thereby reducing the potential for a cumulative force that may injure the child.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child restraint, in accordance with the present disclosure, including a seat bottom and a seat back coupled to the seat bottom, the seat back including a backrest and a headrest, and showing that the headrest includes a rear section and left and right side sections, each side section including a support base, a comfort layer, and an energy-redirection layer or insert that may be added to the headrest to increase side impact force dampening by providing energy-redirection means for a head of a child during a collision event;

FIG. 2 is a perspective view of the headrest shown in FIG. 1 without the energy-redirection layer and suggesting that a side impact experienced by the child may result in a cumulative lateral force on the side wing of the headrest;

FIG. 3 is a perspective view of the headrest shown in FIG. 1 with the energy-redirection layer installed on the headrest and suggesting that the energy-redirection layer is configured to redirect or separate forces imparted on the side wing by the child's head into at least a first force extending laterally into the side section of the headrest and a second force extending outwardly away from the rear section of the headrest so that the child does not experience the cumulative force when impacting the side section;

Figure 9:
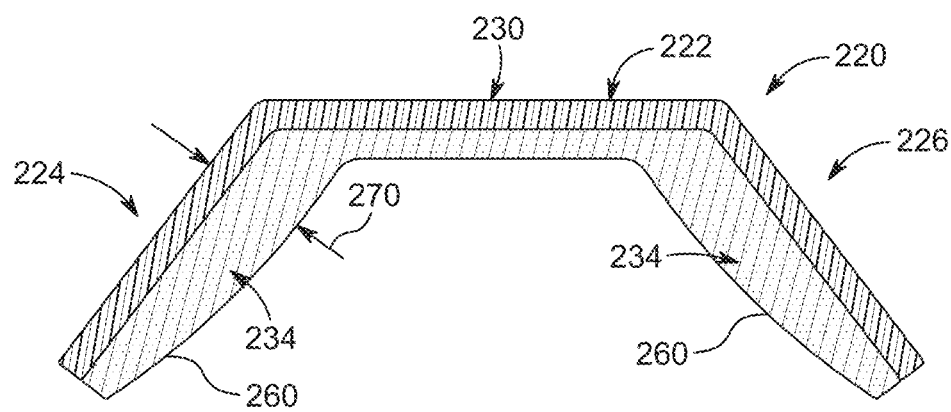
Figure 10:
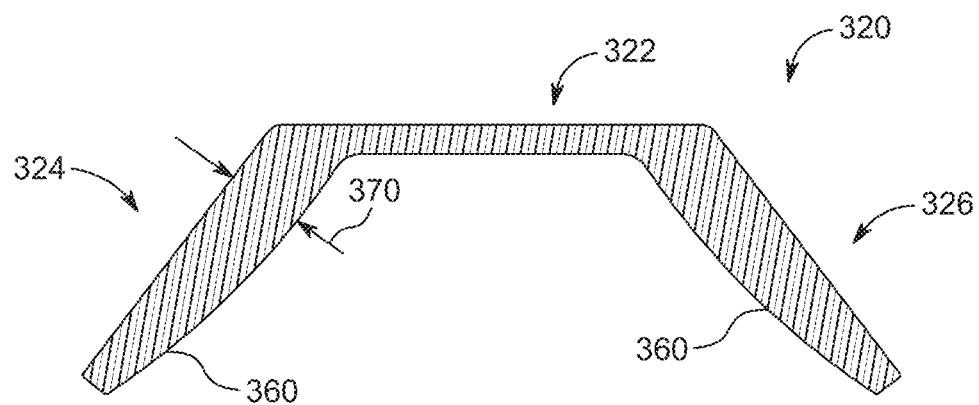
Figure 11:
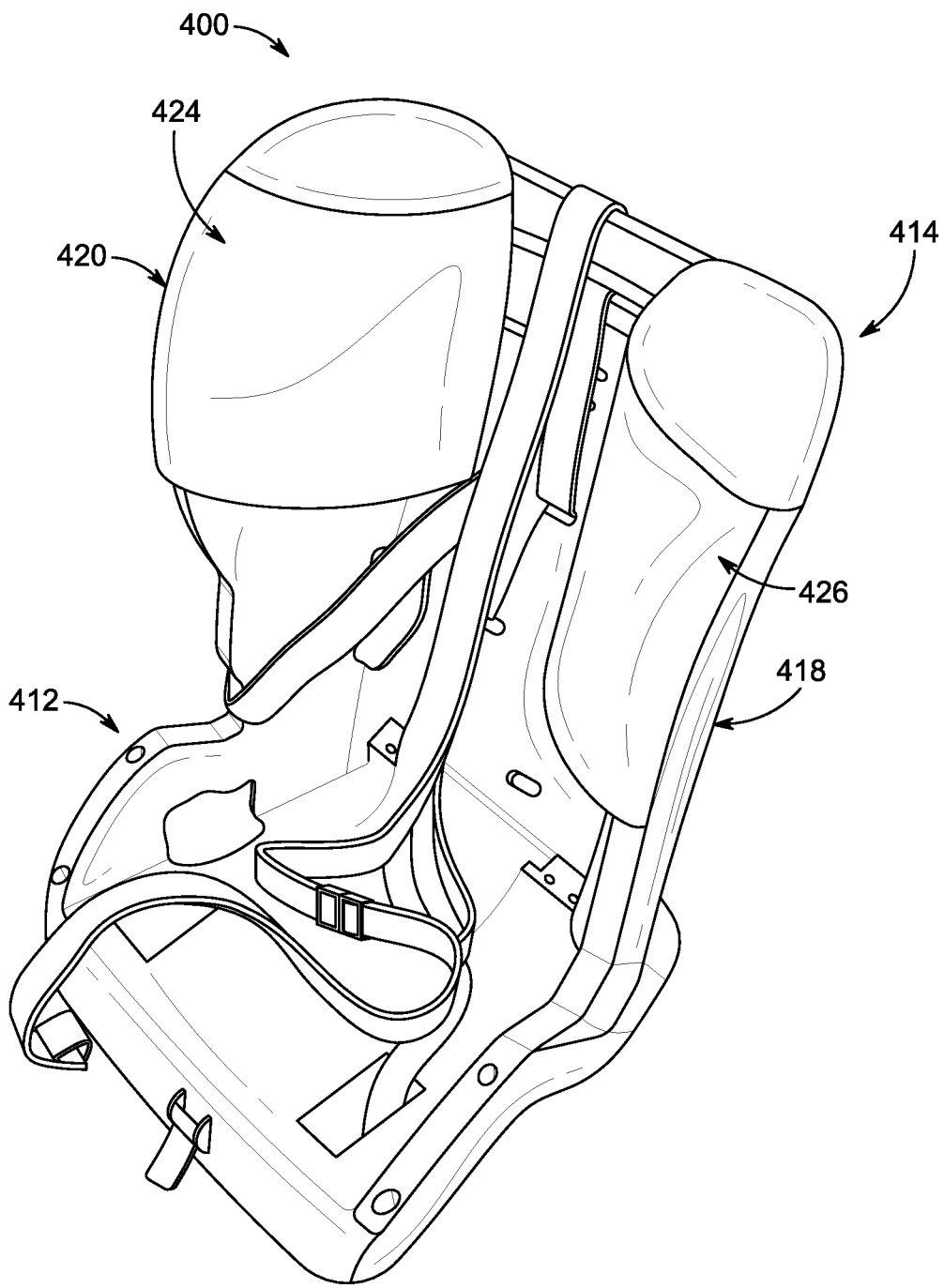
Figure 12:
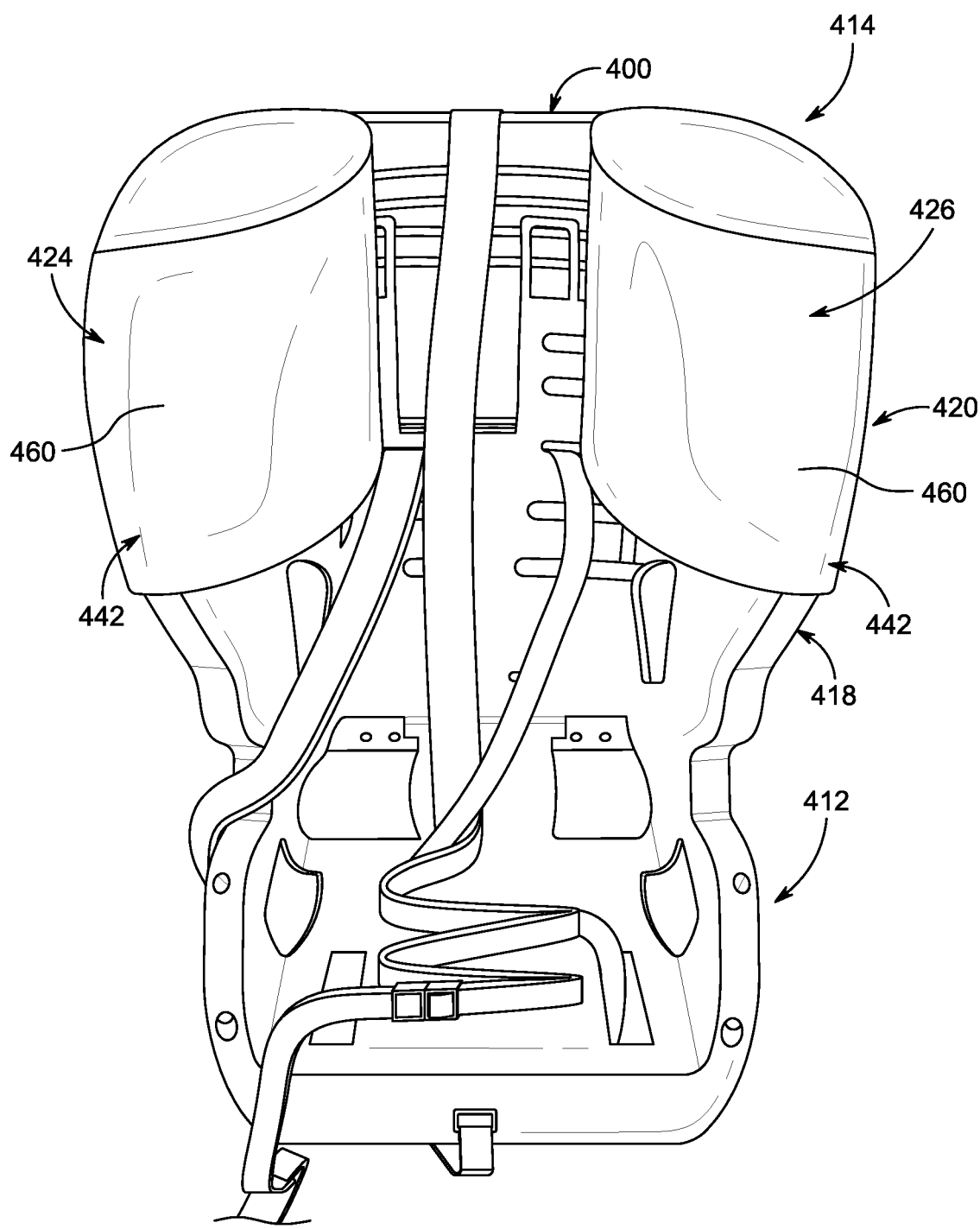

FIG. 9 is a cross-sectional view of another headrest, in accordance with the present disclosure, including a support layer and a one-piece, energy-redirection insert that provides both comfort and energy-redirection means for the head of a child; and FIG. 10 is a cross-section view of another headrest, in accordance with the present disclosure, which is formed as one piece from a plastic material and that is formed to include a left and a right side section having an outwardly-facing convex surface that provides energy-redirection means for the head of a child FIG. 11 is a perspective view of another child restraint, in accordance with the present disclosure, the child restraint including a seat bottom and a seat back having a backrest and an integrated headrest that is fixed to the backrest and includes left and right energy-redirection units for redirecting the child's head during a lateral collision event to minimize forces acting on the child's head from the child restraint; and FIG. 12 is another perspective view of the child restraint from FIG. 11.

DETAILED DESCRIPTION

Figure 1:
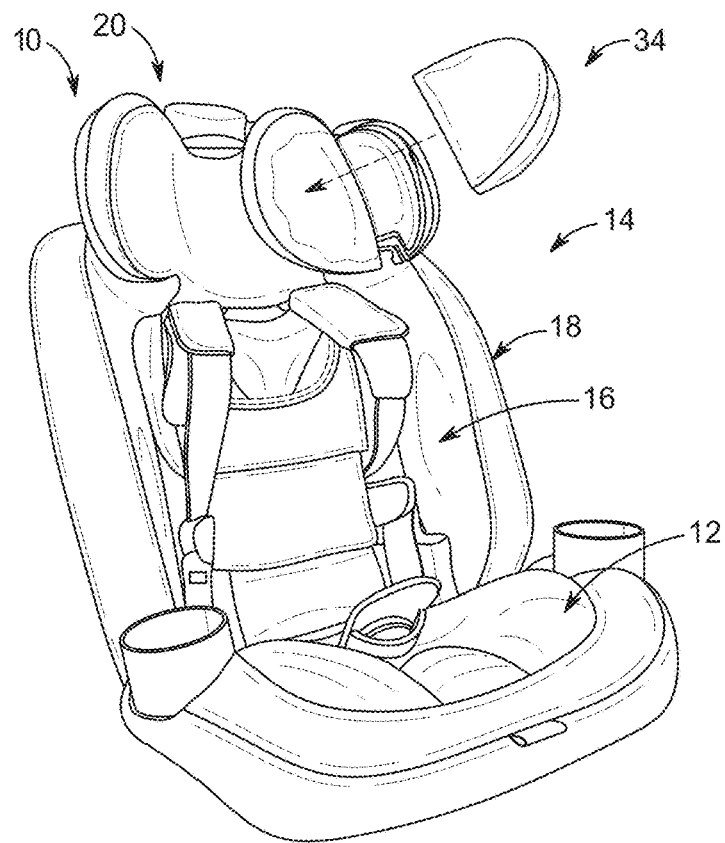
Figure 2:
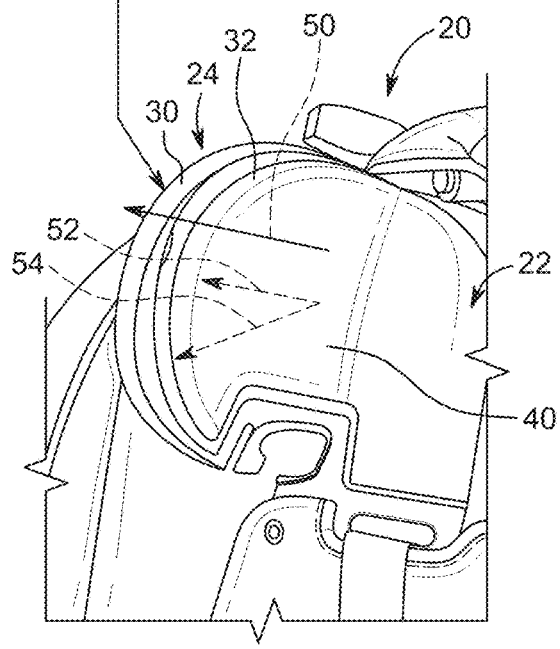
Figure 3:
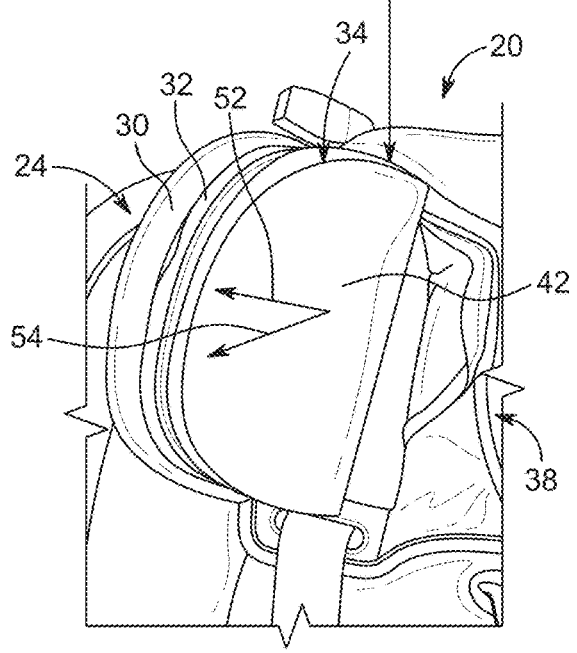

A first embodiment of a child restraint 10 in accordance with the present disclosure is shown in FIGS. 1-3. The child restraint 10 includes a headrest 20 including energy-redirection means or inserts 34 as shown in FIGS. 1-8. A second embodiment of a headrest 220 in accordance with the present disclosure is shown in FIG. 9. A third embodiment of a headrest 320 in accordance with the present disclosure is shown in FIG. 10. A fourth embodiment of a headrest 420 in accordance with the present disclosure is shown in FIGS. 11 and 12.

The child restraint 10 includes a seat bottom 12 and a seat back 14 coupled to the seat bottom 12. The seat bottom 12 and the seat back 14 define a child-receiving space 16 to hold a child for transportation in a vehicle, for example. The seat back 14 includes a backrest 18 coupled to the seat bottom 12 and arranged to extend upwardly from the seat bottom 12 and the headrest 20 coupled to the backrest for supporting a head of the child.

The headrest 20 may include a rear section 22 coupled to the backrest 18, a first side section or wing 24 extending outwardly away from the rear section 22, and a second side section or wing 26 extending outwardly away from the rear section 22 and away from the first side section 24. In some embodiments, the headrest 20 is movable relative to the backrest 18. In some embodiments, the headrest 20 forms an upper part of the backrest 18 and is integral therewith (i.e., fixed in position relative to the backrest).

Figure 4:
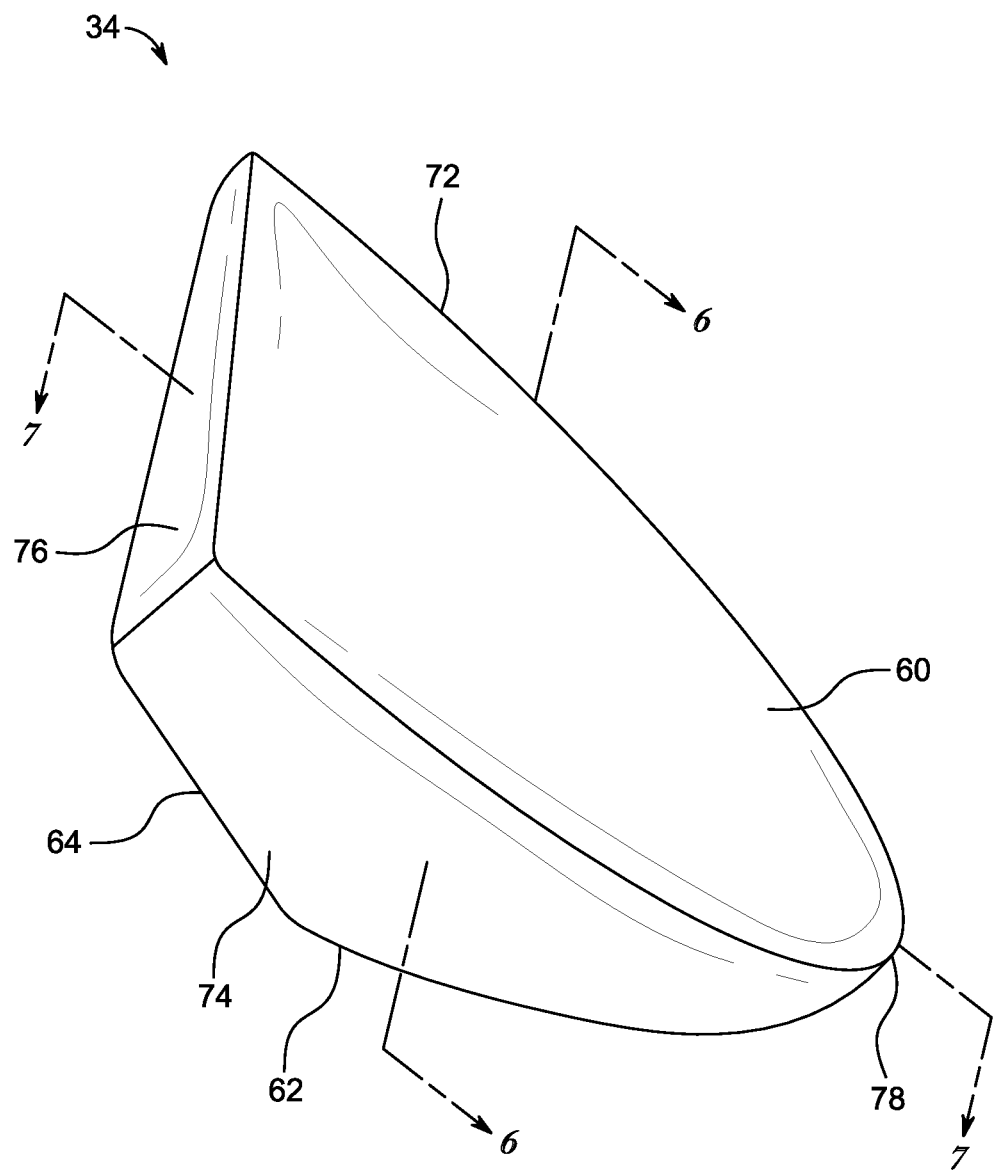
FIG. 4 is a perspective view of one of the energy-redirection layers showing that the energy-redirection layer includes a convex outer surface configured to support the head of the child during the lateral collision event, a rear surface configured to interface with one of the side sections of the headrest, and a chamfered surface configured to interface with the rear section of the headrest.
Figure 5:
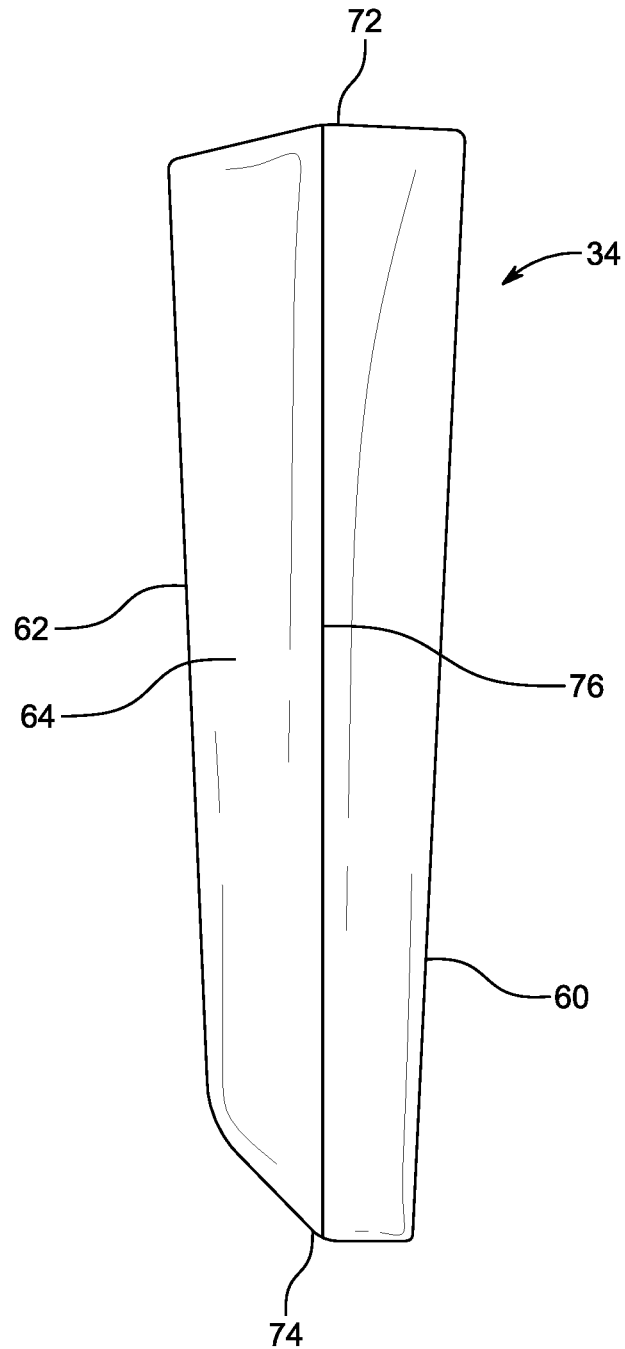
FIG. 5 is a rear view of the energy-redirection layer of FIG. 4.

Each side section 24, 26 includes a support layer 30, a comfort layer 32, and an energy-redirection layer or insert 34 as shown in FIG. 4. The support layer 30 is illustratively a polymeric panel arranged between the backrest 18 and the comfort layer 32. The comfort layer 32 is, for example, a foam layer that is configured to provide cushioning for the head of a child. The support layer 30 and the comfort layer 32 establish an outer contour 40 of each side section 24, 26 that may interact with the head of a child during a collision event to absorb energy from the head of a child when the headrest does not include the energy-redirection layer 34. The energy-redirection layer 34 is configured to replace or rest on top of the comfort layer 32 and establish a second outer contour 42 of the first and second side sections 24, 26 different than the outer contour 40 provided by the comfort layer 32.

The energy-redirection layer 34 is configured to provide energy-redirection means for redirecting at least a portion of a cumulative force 50 from the head of the child during an impact event, for example a lateral collision event, into at least a first force 52 extending into one of the first and second side sections 24, 26 and a second force 54 extending outwardly away from the rear section 22 of the headrest 20 so that the child does not experience the cumulative force 50 when impacting one of the first and second side sections 24, 26. The cumulative force 50 extends in the same direction as first force 52 and has a higher magnitude than first force 52 and second force 54. In some embodiments, cumulative force 50 is split or transformed into first force 52 and second force 54. First force 52 and second force 54 may satisfy safety standards while cumulative force 50 would not have satisfied the same safety standards.

The energy-redirection layer 34 may be an insert that is fitted between the comfort layer 32 and an outer trim 38 of the headrest 20 or between the support layer 30 and the outer trim 38. The child restraint 10 may be retrofitted with the energy-redirection layer 34. Each energy-redirection layer or insert 34 is formed from a material (i.e. a plastic or foam, such as, expanded polyethylene (EPE), expanded polypropylene (EPP), porous expanded polypropylene (P-EPP), cross-linked expanded polyethylene (xEPE), etc.) that does not collapse or compress substantially during a collision event so that the head of the child rolls along an outer surface 60 of the energy-redirection layer 34 during the collision event. In some embodiments, the headrest 20 also does not include any side impact air bags which tend to compress with load and may not direct the head of the child to roll along the outer surface 60.

Each of the energy-redirection layers 34 may have the following properties and/or characteristics shown in Table 1.

TABLE 1

| Physical Property | Unit | EPE | | | | | EPP | | | | xEPE | P-EPP |
|---|---|---|---|---|---|---|---|---|---|---|---|---|
| Average Density | pcd | 1 | 1.3 | 1.5 | 1.9 | 2.8 | 1 | 1.3 | 1.9 | 2.8 | 1.5 | 2.8 |
| Compression Strength @ 25% | psi | 8 | 10 | 11 | 13 | 22 | 11 | 14.5 | 23.5 | 42 | 6 | 23 |
| Compression Strength @ 50% | psi | 16 | 18 | 19 | 22 | 35 | 19 | 23.5 | 33.5 | 54 | 15 | 35 |
| Compression Strength @ 75% | psi | 38 | 44 | 49 | 56 | 75 | 41 | 45 | 64 | 111 | 40 | 79 |
| Tensile Strength | % | 39 | 40 | 45 | 52 | 70 | 35 | 38 | 55.5 | 67 | 22 | 27 |
| Tensile Elongation | lbs/in | 38 | 32 | 30 | 29 | 25 | 18 | 16 | 15 | 14 | 50 | 13 |
| Tear Strength | % | 12 | 14 | 16 | 17 | 21 | 9 | 10 | 13 | 16 | 12 | 19 |
| Comp Set @ 25% | % | 3 | 3 | 4 | 4 | 4 | 8 | 8 | 7 | 7 | 2 | 5 |
| Comp Set @ 50% | % | 12 | 14 | 13 | 12 | 12 | 16 | 14 | 12 | 12 | 6 | 9 |
| Buoyancy | pcf | 61.2 | 60.6 | 59.5 | 59.5 | 59.1 | 61 | 60.5 | 59.5 | 59 | 61 | n/a |
| Thermal Conductivity | (K) BTU-in/ft-hr-f | 0.26 | 0.26 | 0.24 | 0.24 | 0.24 | 0.24 | 0.24 | 0.24 | 0.24 | 0.25 | 0.265 |
| Thermal Resistance | (R) @ 70 F. | 3.9 | 4 | 4.2 | 4.2 | 4.2 | 4.2 | 4.2 | 4.2 | 4.2 | 4 | 3.8 |
| Service Temp | F. | 160 | 160 | 160 | 160 | 160 | 212 | 212 | 212 | 212 | 185 | 212 |
| Water | % | −1 | −1 | −1 | −1 | −1 | −1 | −1 | −1 | −1 | −1 | −1 |

TABLE 1-continued

| Physical Property | Unit | EPE | | | | | EPP | | | | xEPE | P-EPP |
|---|---|---|---|---|---|---|---|---|---|---|---|---|
| Absorption Compression Creep | 1000 hr @ 1 psi | 2.5 | 3 | 3 | 3.3 | 3 | n/a | n/a | n/a | n/a | n/a | n/a |

The properties and/or characteristics in Table 1 above were calculated using the test methods shown in Table 2 at the time of filing this patent application.

TABLE 2

| Physical Property | Test Method |
|---|---|
| Average Density | ASTM-D3575 |
| Comp Strength @ 25% | ASTM-D3575 |
| Comp Strength @ 50% | ASTM-D3575 |
| Comp Strength @ 75% | ASTM-D3575 |
| Tensile Strength | ASTM-D3575 |
| Tensile Elongation | ASTM-D3575 |
| Tear Strength | ASTM-D3575 |
| Comp Set @ 25% | ASTM-D3575 |
| Comp Set @ 50% | ASTM-D3575 |
| Buoyancy | ASTM-D3575 |
| Thermal Conductivity | ASTM-C177 |
| Thermal Resistance | ASTM-C178 |
| Service Temp | ASTM-D3575 |
| Water Absorption | ASTM-D3575 |
| Comp Creep | ASTM-D3575 |

Each of the materials shown in Table 1 also passed a Flammabilty test according to test method FMVSS-302. Each of the materials shown in Table 1 also passed a Fuel Immersion test according to test method Coast Guard (CGD-770145) Fuel B.

Figure 6:
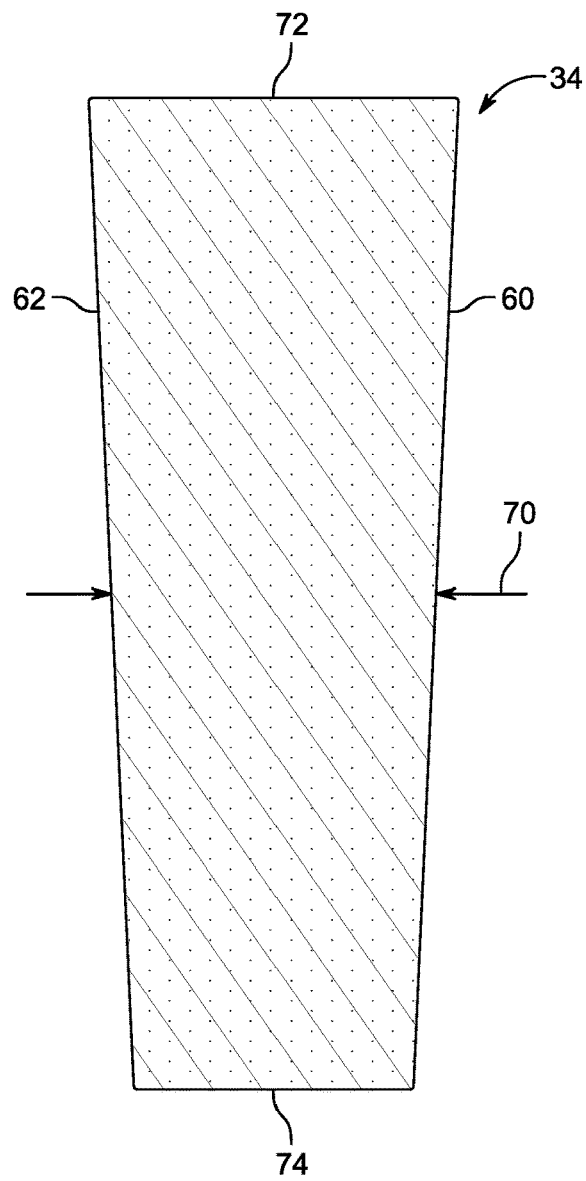
FIG. 6 is a cross-sectional view of the energy-redirection layer taken along line 6-6 in FIG. 4 showing that the energy-redirection layer has a thickness that decreases from an upper end of the energy-redirection layer to a lower end of the energy-redirection layer.
Figure 7:
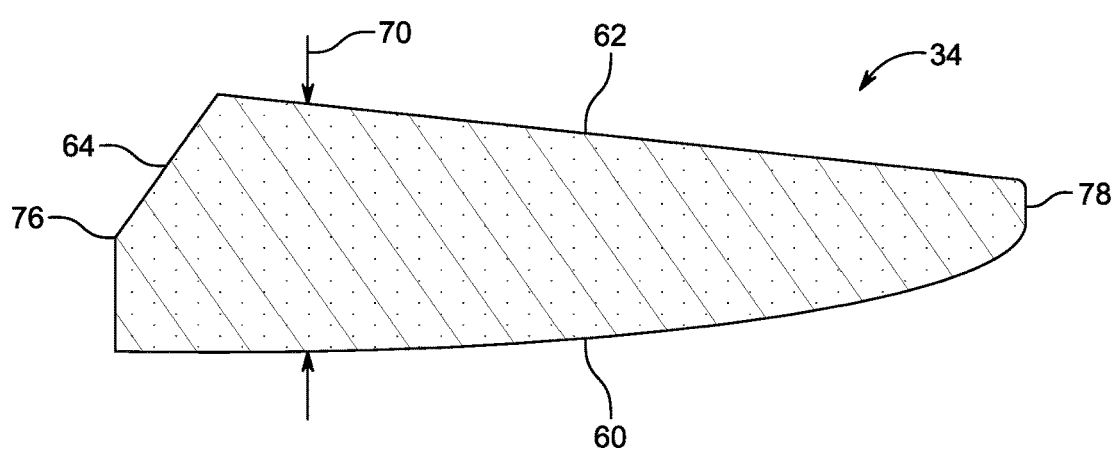
FIG. 7 is a cross-sectional view of the energy-redirection layer taken along line 7-7 in FIG. 4 showing the shape of the energy-redirection layer that provides the convex outer surface, the rear surface, and the chamfered surface.

Each energy-redirection insert 34 may include a convex, outer, energy-redirection surface 60 providing the second outer contour 42, a rear surface 62 matching the outer contour 40, and a chamfered surface 64 as shown in FIGS. 6 and 7. The outer surface 60, for example, is curved and may cause the head of the child to roll along the outer surface 60 during the collision event to provide the first and second forces 52, 54 rather than the cumulative force 50. The rear surface 62 abuts against matches the outer contour 40 of the respective side section without the energy-redirection layer 34 to minimize movement of the energy-redirection layer 34 relative to the rest of the headrest 20. The chamfered surface 64 abuts against and interfaces with the rear section 22. In one example, the outer surface 60 may be convex relative to the head of the child and concave relative to the support layer 30.

Each energy-redirection layer 34 or insert has a thickness 70 that changes to provide the energy-redirection means as shown in FIGS. 6 and 7. For example, the thickness 70 of the energy-redirection layer 34 may decrease from an upper end 72 to a lower end 74 of the energy-redirection layer 34 as shown in FIG. 6. The thickness 70 may also decrease from a rear end 76 to a forward end 78 of the energy-redirection layer 34 as shown in FIG. 7. In some embodiments, the thickness 70 decreases constantly from the upper end 72 to the lower end 74 and/or from the rear end 76 to the forward end 78. In some embodiments, the thickness 70 decreases gradually from the upper end 72 to the lower end 74 and/or from the rear end 76 to the forward end 78. In some embodiments, the thickness 70 changes gradually (i.e. increases and decreases) from the upper end 72 to the lower end 74 and/or from the rear end 76 to the forward end 78. This thickness 70 causes the head of a child to roll across outer surface 60 and to tilt downwardly during a collision event to minimize forces acting between the headrest 20 and the head of the child.

Figure 8:
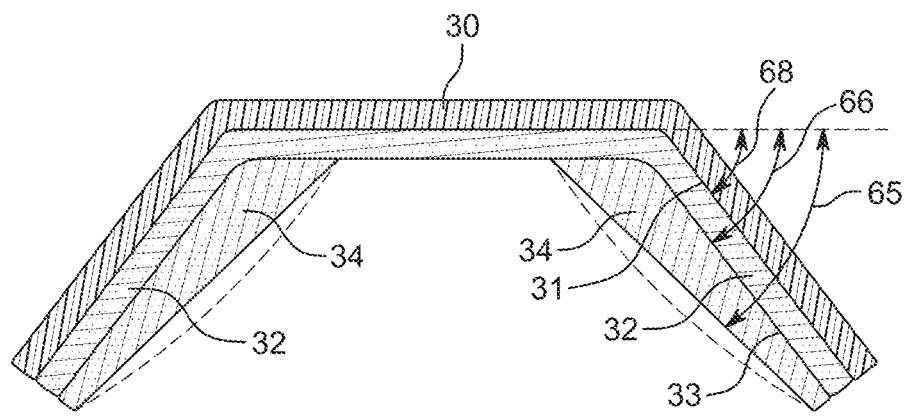
FIG. 8 is a cross-sectional view of the headrest from FIGS. 1-3 showing the support layer, the comfort layer, and the energy-redirection inserts interfacing with one another.

The energy-redirection layer 34 may change an angle of the outermost surface of the side sections 24, 26 relative to rear section 22 compared to comfort layer 32 or support layer 30. In some embodiments, an angle 65 between the outer surface 60 of each energy-redirection insert 34 and the rear section 22 is less than an angle 66 between an outer surface 33 of the comfort layer 32 and/or an angle 68 between outer surface 31 of the support layer 30 and the rear section 22 as shown in FIG. 8. The outer surface 60 of each energy-redirection insert 34 may be substantially planar or may have a convexly-shaped outer contour 42 as suggested in FIG. 8.

Another embodiment of a headrest 220 that can be included in child restraint 10 in place of headrest 20 and energy-redirection inserts 34 is shown in FIG. 9. The headrest 220 is similar to headrest 20. Accordingly, similar reference numbers in the 200 series are used to indicate similar features between headrest 220 and headrest 20. The disclosure for headrest 20 is hereby incorporated by reference herein for headrest 220.

The headrest 220 includes a support layer 230 and an energy-redirection layer 234 as shown in FIG. 9. The support layer 230 may be made from a rigid plastic material, such as polypropylene sheeting or molded high impact rated resin, to support the head of a child seated on the child restraint 10. The energy-redirection layer 234 may be made from a foam material to provide both comfort and energy-redirection means for a child's head. Both the support layer 230 and the energy-redirection layer 234 provide portions of a rear section 222 and side sections 224, 226 of the headrest 220.

The energy-redirection layer 234 may replace a comfort layer(s) (i.e. comfort layer 32) previously included in the headrest 20 while also providing energy-redirection means. The energy-redirection layer 234 has an outer, energy-redirection surface 260 that interacts with the head of the child to provide the comfort and the energy-redirection means. The outer surface 260 of the energy-redirection layer 234 is convexly-curved to gradually decrease an angle of the outer surface 260 of each side section 224, 226 relative to the rear section 222 as the outer surface 260 extends away from the rear section 222.

A thickness 270 of the energy-redirection layer 234 decreases in each side section 224, 226 as the energy-redirection layer 234 extends away from the rear section 222. The thickness 270 may decrease gradually and/or constantly from the rear section 222 to a distal end of each side section 224, 226. The thickness 270 may change gradually from the rear section 222 to the distal end of each side section 224, 226. For example, the thickness 270 may first increase from the rear section 222 to a point about midway between the rear section 222 and the distal end and then decrease from the point to the distal end of each side section 224, 226. In some embodiments, the outer surface 260 of the energy-redirection layer 234 is substantially planar.

Another embodiment of a headrest 320 that may be included in child restraint 10 in place of headrest 20 and energy-redirection inserts 34 is shown in FIG. 10. The headrest 320 is similar to headrest 20. Accordingly, similar reference numbers in the 300 series are used to indicate similar features between headrest 320 and headrest 20. The disclosure for headrest 20 is hereby incorporated by reference herein for headrest 320.

The headrest 320 is formed as a one-piece component that includes a rear section 322 and left and right side sections 324, 326 as shown in FIG. 10. The headrest 320 may be made from a rigid plastic material to support the head of a child seated on the child restraint 10 and that is shaped to provide energy-redirection means for the head of the child. In some embodiments, the headrest 320 may be made from a foam material to provide both comfort and energy-redirection means for a child's head or combinations of foam and rigid plastic material.

The side sections 324, 326 each have an outer, energy-redirection surface 360 that interacts with the head of the child to provide the comfort and/or the energy-redirection means. The outer surface 260 of the headrest 320 is convexly-curved to gradually decrease an angle of the outer surface 360 of each side section 324, 326 relative to the rear section 322 as the outer surface 360 extends away from the rear section 322.

A thickness 370 of each side section 324, 326 decreases as each side section 324, 326 extends away from the rear section 322. The thickness 270 may decrease gradually and/or constantly from the rear section 322 to a distal end of each side section 324, 326. The thickness 370 may change gradually from the rear section 322 to the distal end of each side section 324, 326. For example, the thickness 370 may first increase from the rear section 322 to a point about midway between the rear section 322 and the distal end and then decrease from the point to the distal end of each side section 324, 326. In some embodiments, the outer surface 360 of each side section 324, 326 is substantially planar.

Another embodiment of a child restraint 400 with an integrated headrest 420 is shown in FIGS. 11 and 12. Similar reference numbers in the 400 series are used to indicate similar features between child restraint 400 and child restraint 10. The disclosure for child restraint 10 is hereby incorporated by reference herein for child restraint 400.

The child restraint 400 includes a seat bottom 412 and a seat back 414. The seat back 414 includes a backrest 418 and a headrest 420 coupled to the backrest 418. The headrest 420 is integrated into backrest 418 of the child restraint 400 so as to be mounted to the backrest 418 in a fixed position. The headrest 420 includes first and second side sections 424, 426. Each side section 424, 426 has a convexly-shaped, energy-redirection surface 460 that interacts with the head of the child. The energy-redirection surface 460 provides an outer contour 442 of the headrest that minimizes forces acting on the head of the child during a collision event. The headrest 420 may be covered with a trim and/or soft goods or foam to increase comfort for the child.

The child restraints 10, 200 were tested in a side impact simulator to determine head injury criterion of the child. The child restraints having side section outer contour 40 received a Head Injury Criterion (HIC) score of about 700. Unexpectedly, changing the outer contour 40 to second outer contour 42 using energy-redirecting layer surface 60, 260, 360, 460 decreased the HIC score by more than 50% to about 321. It was previously thought that providing a surface such as surface 60, 260, 360, 460 would adversely affect the HIC score.

The invention claimed is:

1. A child restraint comprising
a seat bottom,
a seat back coupled to the seat bottom and including a backrest configured to extend upwardly from the seat bottom and a headrest coupled to the backrest for supporting a head of a child, the headrest including a rear section arranged along the backrest, a first side section extending outwardly away from the rear section, and a second side section extending outwardly away from the rear section and away from the first side section, and
energy-redirection means coupled to the first and second side sections for redirecting at least a portion of a cumulative force from the head of the child during an impact event into at least a first force extending into one of the first and second side sections and a second force extending outwardly away from the rear section of the headrest so that the head of the child does not experience the cumulative force when impacting the one of the first and second side sections,
wherein each side section of the headrest includes a support layer and an energy-redirection layer arranged to lie on a forward side of the support layer to face toward the head of the child, the energy-redirection layer having an outer surface that provides the energy-redirection means,
wherein the outer surface of the energy-redirection layer is a convexly-shaped surface relative to the head of the child, and
wherein the energy-redirection layer has a thickness that changes as the energy-redirection layer extends away from the rear section toward a distal end of a corresponding side section.

2. The child restraint of claim 1, wherein the headrest forms an upper part of the backrest.

3. The child restraint of claim 1, wherein the support layer of the first and second side sections have a first outer contour and the energy-redirection layer of the first and second side sections have a second outer contour, different than the first outer contour, that provides the energy-redirection means.

4. The child restraint of claim 1, wherein the headrest is movable relative to the backrest.

5. The child restraint of claim 1, wherein the thickness decreases as the energy-redirection layer extends away from the rear section toward the distal end of the corresponding side section.

6. The child restraint of claim 5, wherein the thickness decreases as the energy-redirection layer extends from an upper end of the energy-redirection layer to a lower end of the energy-redirection layer.

7. A child restraint comprising
a seat bottom and
a seat back coupled to the seat bottom and including a backrest configured to extend upwardly from the seat bottom and a headrest coupled to the backrest for supporting a head of a child, the headrest including a rear section arranged along the backrest, a first side section extending outwardly away from the rear section, and a second side section extending outwardly away from the rear section and away from the first side section,
wherein the first side section and the second side section each include an outer energy-redirection surface that is configured to redirect a cumulative force from the head of the child during a lateral impact event into at least a first force extending into one of the first and second side sections and a second force extending outwardly away from the rear section of the headrest so that the head of the child does not experience the cumulative force when impacting the one of the first and second side sections, the first and second forces each being less than the cumulative force, wherein each side section of the headrest includes a support layer and an energy-redirection layer arranged to lie on a forward side of the support layer to face toward the head of the child to provide the outer energy-redirection surface, and wherein the energy-redirection layer has a thickness that decreases as the energy-redirection layer extends away from the rear section toward a distal end of a corresponding side section.

8. The child restraint of claim 7, wherein the first and second side sections each further include a comfort layer coupled to the support layer, and each corresponding energy-redirection layer overlies the comfort layer when installed.

9. The child restraint of claim 8, wherein the comfort layer has a first outer contour in each side section and each energy-redirection surface has a second outer contour different than the first outer contour.

10. The child restraint of claim 9, wherein the second outer contour is convexly shaped relative to the head of the child.

11. The child restraint of claim 7, wherein the thickness decreases as the energy-redirection layer extends from an upper end of the energy-redirection layer to a lower end of the energy-redirection layer.

12. The child restraint of claim 11, wherein the headrest is movable relative to the backrest.

* * * * *